(12) United States Patent
Fertig

(10) Patent No.: US 11,181,726 B2
(45) Date of Patent: Nov. 23, 2021

(54) NON-CONTACT CONFINEMENT AND VIBRATIONAL ISOLATION OF ELECTROMAGNETIC RESONATORS

(71) Applicant: Honeywell International Inc., Morris Plains, NJ (US)

(72) Inventor: Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 118 days.

(21) Appl. No.: 16/661,848

(22) Filed: Oct. 23, 2019

(65) Prior Publication Data
US 2021/0124158 A1  Apr. 29, 2021

(51) Int. Cl.
*G02B 17/00* (2006.01)
*G04F 5/14* (2006.01)

(52) U.S. Cl.
CPC .............. *G02B 17/004* (2013.01); *G04F 5/14* (2013.01)

(58) Field of Classification Search
CPC .................................................. G02B 17/004
USPC ......................................................... 359/861
See application file for complete search history.

(56) References Cited

U.S. PATENT DOCUMENTS

| 4,454,482 A * | 6/1984 | DeMarchi ................. H03L 7/26 331/3 |
| 4,814,728 A * | 3/1989 | Strayer ..................... H01S 1/02 330/4 |
| 4,965,429 A | 10/1990 | Polstorff |
| 2004/0196874 A1 * | 10/2004 | Spiegelberg ........ H01S 3/06716 372/6 |
| 2009/0116163 A1 | 5/2009 | Fichter et al. |
| 2015/0204899 A1 | 7/2015 | Salit et al. |

FOREIGN PATENT DOCUMENTS

CN  104158431 B  5/2016

* cited by examiner

*Primary Examiner* — Joseph Chang
(74) *Attorney, Agent, or Firm* — Fogg & Powers LLC

(57) ABSTRACT

Systems and methods providing non-contact confinement and vibration isolation of electromagnetic resonators are provided herein. In certain embodiments, a device includes an electromagnetic resonator body. The device further includes a frame enclosing a volume, wherein the electromagnetic resonator is located within the volume. Additionally, the device includes a plurality of body electrodes mounted on the electromagnetic resonator body. Also, the device includes a plurality of frame electrodes mounted on the frame. Moreover, the device includes an electrode controller, wherein the electrode controller drives the plurality of frame electrodes to isolate the electromagnetic resonator body from vibrations to the frame by allowing a rattle space between external surfaces of the electromagnetic resonator body and internal surfaces of the frame to approach but be greater than zero.

20 Claims, 8 Drawing Sheets

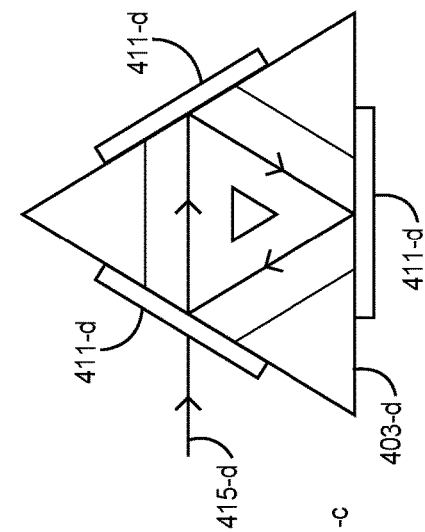
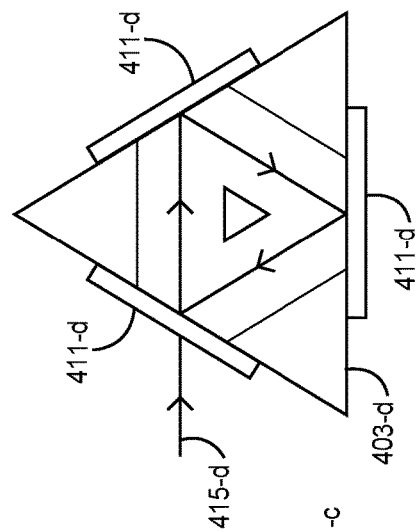
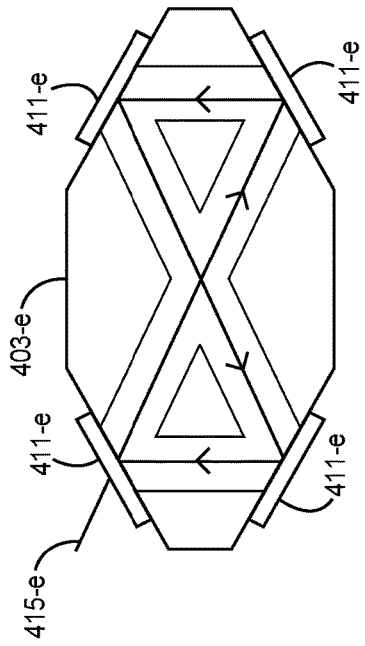
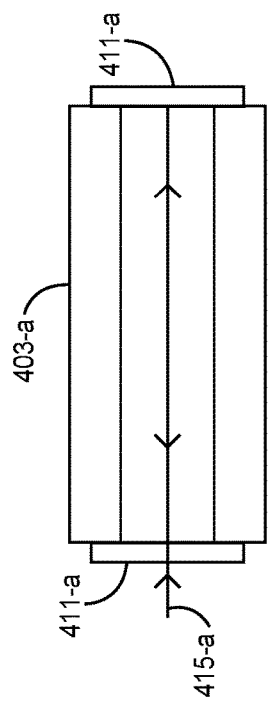
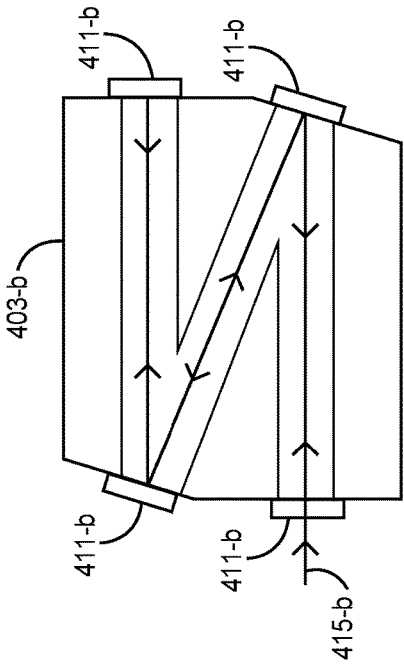

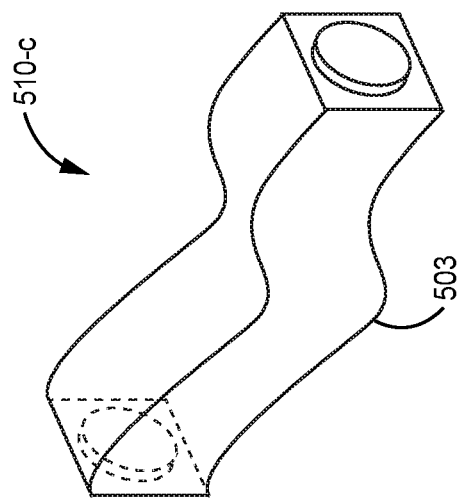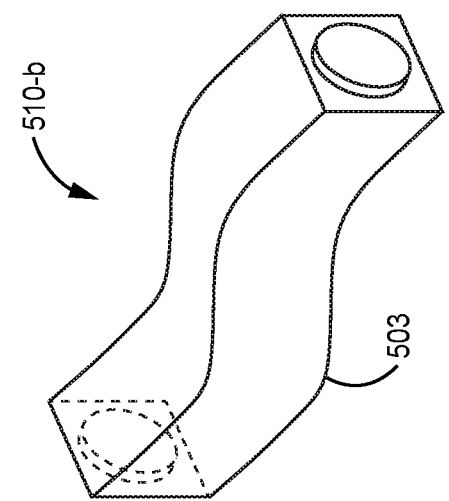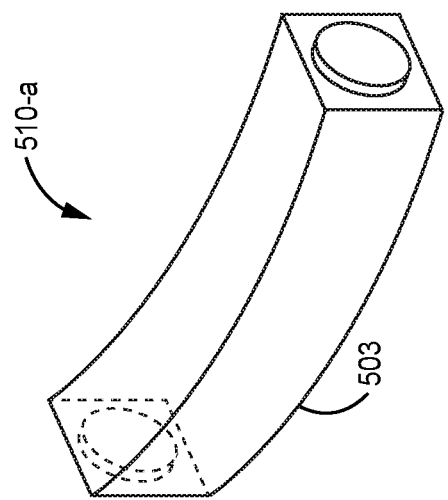
FIG. 5

NON-CONTACT CONFINEMENT AND VIBRATIONAL ISOLATION OF ELECTROMAGNETIC RESONATORS

BACKGROUND

Atomic clocks are frequently used to provide accurate time and frequency standards. They are used for the distribution of international time, to control the frequencies of broadcasted signals, and in global navigation satellite systems (GNSS) such as the global positioning system (GPS), GLONASS, BeiDou, or Galileo. One type of atomic clock that is used for providing a time standard is an optical clock. In optical clocks, a laser is used to measure the frequency of optical transitions in atoms. To measure accurately, the frequency of the interrogating laser may be pre-stabilized to the optical resonance.

In some implementations, the laser is pre-stabilized to a mode of an optical resonator, or optical cavity, in which a laser field stably circulates between one or more reflecting mirrors configured in a stable geometry. One such type of optical cavity is a standing wave optical cavity, such as a Fabry-Perot optical cavity; another such type of optical cavity is a traveling wave optical cavity, such as a bow-tie ring cavity. To pre-stabilize the laser using the optical cavity, light from the laser is introduced into the cavity, the laser light circulates in the cavity, and the laser frequency is adjusted to align the frequency of the laser to accord with one of the resonant frequencies of the optical cavity. In this way an optical cavity may be used to pre-stabilize the frequency of the interrogating laser, to improve the operation of an optical clock.

The performance of optical cavities (i.e., the stability of the frequencies of their optical modes) is often degraded due to the transmission of forces to the cavity by its support structure, the forces causing distortions of the shape of the cavity, and thus of the frequencies of the cavity modes used as references for pre-stabilizing the interrogation laser.

Moreover, the shape of current ultra-high performance optical cavities is typically chosen as s compromise between optimum configuration of the mirrors, and optimum shape of the spacer, so as to minimize the effects of mechanical vibrations on the orientation of the mirrors. A method of holding optical cavities which may exhibit vastly reduced distortion of the cavity would enable additional design degrees of freedom for the configuration of the mirrors, such as configurations in which the symmetry of the optical modes defined by the mirror configuration differs significantly from the symmetry of the mechanical modes of the spacer.

SUMMARY

Systems and methods providing non-contact confinement and vibration isolation of electromagnetic resonators are provided herein. In certain embodiments, a device includes an electromagnetic resonator body. The device further includes a frame enclosing a volume, wherein the electromagnetic resonator is located within the volume. Additionally, the device includes a plurality of body electrodes mounted on the electromagnetic resonator body. Also, the device includes a plurality of frame electrodes mounted on the frame. Moreover, the device includes an electrode controller, wherein the electrode controller drives the plurality of frame electrodes to isolate the electromagnetic resonator body from vibrations to the frame by allowing a rattle space between external surfaces of the electromagnetic resonator body and internal surfaces of the frame to approach but be greater than zero.

DRAWINGS

Understanding that the drawings depict only some embodiments and are not therefore to be considered limiting in scope, the exemplary embodiments will be described with additional specificity and detail using the accompanying drawings, in which:

FIGS. 4A-4E are diagrams illustrating various configurations for electromagnetic resonators that are electrostatically confined within a frame according to an aspect of the present disclosure;

FIG. 5 is a diagram illustrating data discovered through the performance of a mechanical modal analysis according to an aspect of the present disclosure;

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Embodiments described herein describe systems and methods for electrostatically confining objects within a volume. For example, an object may be an optical reference cavity that is supported using electrostatic forces within a volume enclosed by a frame. The object may be electrostatically confined within a volume through the use of electrodes affixed to or patterned on the internal surfaces of the frame and affixed to or patterned on the external surfaces of the object. As described herein the electrostatic forces applied by the electrodes may allow the object to move about the volume while maintaining a gap between the object and the internal surfaces of the frame.

Accordingly, when the frame and object are in a micro-G or zero G environment, the object may float about the volume but the electrostatic forces prevent the external surfaces of the object from contacting the internal surfaces of the frame.

Additionally, the electrostatic forces applied to the object may be electronically processed to filter high frequency forces (vibrations) experienced by the frame from being communicated to the object, whereas quasi-DC forces may be applied to prevent the external surfaces of the object from contacting the internal surfaces of the frame in the cases that the frame experiences quasi-DC acceleration. An example of vibrations that would be electronically filtered from the electrostatic actuators would be vibrations due to reaction controls on a satellite. An example of quasi-DC forces that would be applied to the object so as to maintain a gap between the object and the frame would be the mean orbital acceleration of the satellite bus.

Additionally, in some implementations, the electrodes may be located at locations on the internal surface of the frame and the external surface of the object such that forces applied to the object are applied at the nodes of one or more mechanical modes of the object.

Figure 1:
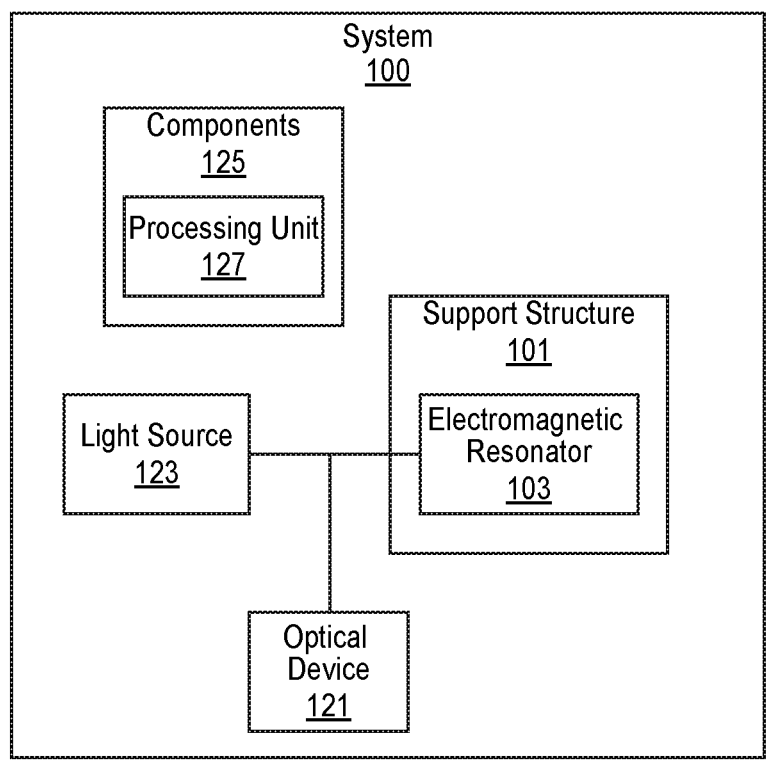
FIG. 1 is a block diagram of an exemplary system having an electromagnetic resonator cavity according to an aspect of the present disclosure.

FIG. 1 is a block diagram of an exemplary system 100, where the system 100 includes an electromagnetic resonator 103 that is used to provide a reference signal that is used by an optical device 121 to lock a laser beam produced by a light source 123 to a particular frequency. As used herein, the light source 123 may refer to any device capable of producing a laser beam. Further, a laser beam may also be referred to herein as an optical beam, laser light, light beam, or other similar term or phrase. Also, as used herein, the optical device 121 may be an atomic clock, a ring laser gyroscope, or other device that uses laser beams that are locked to a particular frequency. For example, when the optical device 121 is an atomic clock (and in particular an optical clock), the laser beam produced by the light source 123 may be locked to a particular frequency and used to interrogate atoms located within a volume. For example, the atoms may be rubidium, cesium, strontium, hydrogen, or other suitable elements or combination of elements.

In certain embodiments, to lock the laser beam produced by the light source 123 to a particular frequency, the system 100 may include an electromagnetic resonator 103. As used herein, the electromagnetic resonator 103 may receive a laser beam from the light source 123 whereupon, the laser beam may enter the electromagnetic resonator 103 and be reflected between multiple mirrors within the electromagnetic resonator 103, where the mirrors are spaced apart such that light that resonates within the electromagnetic resonator 103 resonates at a desired frequency. The resonating laser beams within the electromagnetic resonator 103 may be detected using a photodetector or coupled to the laser beam produced by the light source 123 to lock the laser beam that enters the optical device 121 to a particular frequency. For example, the electromagnetic resonator 103 may be a Fabry-Pérot etalon or other type of electromagnetic resonator 103.

Further, when the optical device 121 is an optical clock, the laser beam produced by the light source 123 and the signal or light produced by the electromagnetic resonator 103, may be used to provide precise time signals. However, the precision of the optical device 121 may be affected by vibrations experienced by the electromagnetic resonator 103. Frequently, to reduce the effects of vibration on the performance of the system 100, the system 100 may include a support structure 101 that supports the electromagnetic resonator 103 in such a way to reduce the effects of vibration on the electromagnetic resonator 103. For example, in laboratory environments, support structures 101 for the electromagnetic resonator 103 may be elaborately designed to reduce the effects of vibration on the electromagnetic resonator 103.

However, the performance of the electromagnetic resonator 103 and other similar optical cavities (the performance being the stability of the frequencies of the associated optical modes) is frequently degraded due to the transmission of forces to the cavity by a connected support structure 101. The transmitted forces may cause distortions in the shape of the optical cavity within the electromagnetic resonator 103, which distortions can change the frequencies of the cavity modes used as references for pre-stabilizing the interrogation laser. The effects of gravity on the electromagnetic resonator 103 provide an example of the type of forces transmitted to the electromagnetic resonator 103 by the support structure 101 that cause distortions in the shape of the optical cavity. For example, the support structure 101 may press against external surfaces of the electromagnetic resonator 103 to support the weight of the electromagnetic resonator 103. A portion of the vibration experienced by the system 100 may be transmitted to the electromagnetic resonator 103 through the physical support structure 101, affecting the precision of the system 100. Accordingly, methods and systems are described herein for holding the electromagnetic resonator 103 that reduce or eliminate the effects of constraining forces and enable optical devices, such as optical clocks, to have vastly increased performance, such as up to a 1000× increase in stability.

Moreover, the shape of current ultra-high performance optical cavities is typically chosen as a compromise between a desired configuration of mirrors within the electromagnetic resonator 103, and a desired shape of a spacer in the electromagnetic resonator 103, so as to limit the effects of mechanical vibrations on the orientation of the mirrors. The methods and systems described herein for holding optical cavities that exhibit reduced distortion of the cavity may also enable additional design degrees of freedom for the configuration of the mirrors. For examples, mirror configurations may define symmetries for the optical modes that differ significantly from the symmetry of the mechanical modes of the spacer.

In some embodiments, the system 100 may be deployed in zero G or micro G environments, such as inside an orbiting satellite. For example, the system 100 may be used to provide a time signal within a GNSS system or the system 100 may provide inertial measurements. In the zero G or micro G environments, the effects of gravity are significantly reduced to be almost negligible. However, other sources of vibrations within the system 100 may affect the accuracy of the electromagnetic resonator 103. For example, other components 125 on board the system 100 may provide sinusoidal sources of vibration that may affect the support structure 101 and the electromagnetic resonator 103. Sources of vibrations may include motors, fans, hydraulic pumps, momentum devices, and the like. When the support structure 101 is a rigid support structure that is physically connected to the electromagnetic resonator 103, the support structure 101 may impart vibrations produced by the other components 125 to the electromagnetic resonator 103.

In certain embodiments, the support structure 101 may be designed to take specific advantage of the zero G or micro G environment. Specifically, the support structure 101 may support the electromagnetic resonator 103 without making physical contact with the resonator, such as the physical contact made through clamps, brackets, or other mechanical fasteners. For example, the support structure 101 may be a frame enclosing an interior volume, where the frame has one or more electrodes that exert an electromagnetic force on electrodes located on the electromagnetic resonator 103. Accordingly, through the application of electromagnetic (i.e., non-contact) force, the electromagnetic resonator 103 may be supported within a frame without any material members connecting the resonator to the frame.

Additionally, the electrodes may exert electromagnetic forces on the body of the electromagnetic resonator 103 such that the body of the electromagnetic resonator 103 may move within a volume enclosed by a frame while preventing the body of the electromagnetic resonator 103 from contacting internal surfaces of the frame. In other words, the electrodes exert electromagnetic forces to keep the body in nearly free-fall inside the support structure 101, while preventing the body from contacting the internal surfaces of the frame of the support structure. As used herein, the term "rattle space" may refer to the region of volume between an external surface of the body of the electromagnetic resonator 103 and an internal surface of the frame. In environments subject to gravitational forces, electrodes may exert sufficient electromagnetic forces to support the body of the electromagnetic resonator 103 against gravitational acceleration and keep the electromagnetic resonator 103 levitated within an internal volume of a frame along with not exciting mechanical modes of the body of the electromagnetic resonator 103.

In additional embodiments, the electrodes may exert electromagnetic forces in such a way as to not excite mechanical modes of the electromagnetic resonator 103.

In additional embodiments, the electrodes and sensors may be used to monitor the movement (position, velocity, and/or acceleration) of the body of the electromagnetic resonator 103 within a volume of a frame. The electrodes and sensors may provide signals to a processing unit 127 within the system 100 that are associated with the movement of the electromagnetic resonator 103 within the volume of the support structure. The processing unit 127 may use the received signals to determine the timing, magnitude and locations of the electromagnetic forces to apply to the body of the electromagnetic resonator 103, so as to keep it in the rattle space, but in a manner which reduces or eliminates the excitation of mechanical modes of the resonator. As used herein, processing unit 127 may be a device that executes computer executable instructions that direct the processing unit 127 to control the operation of the electrodes within the support structure 101. In some embodiments the instructions may be stored on a memory storage device within the system 100 or received through a communication network and executed as the instructions are received by the processing unit 127, and the like.

In some embodiments, the processing unit 127 and other computational devices found within the system 100 may be implemented using software, firmware, hardware, or other appropriate combination thereof. The processing unit 127 and other computational devices may be supplemented by, or incorporated in, specially-designed application specific integrated circuits (ASICs) or field programmable gate arrays (FPGAs). The processing unit 127 and other co-optation devices may also include or function with software programs, firmware, or other computer readable instructions for carrying out various process tasks, calculations, and control functions used in the present methods and systems.

In certain embodiments, the processing unit 127 may filter out high-frequency movements associated with the other components 125 within the system 100. For example, vibrations associated with fans, heaving associated with pumps, or other sinusoidal sources of movement within the system 100 may have a limited effect on the movement of the support structure 101 and/or electromagnetic resonator 103 over time. However, other sources of movement that are not sinusoidal in nature may affect the position of the electromagnetic resonator 103 in relation to the position of the support structure 101. For example, atmospheric drag experienced by a satellite may slow down the motion of the satellite and the support structure 101 mounted within the satellite. As the electromagnetic resonator 103 is levitated within a volume of the support structure 101, the electromagnetic resonator 103 may not be subject to the forces exerted by the atmospheric drag. Accordingly, the electromagnetic resonator 103 may not slow down when the support structure 101 slows down due to atmospheric drag. Accordingly, the processing unit 127 may receive signals from the support structure 101 indicating the position of the electromagnetic resonator 103 within the support structure 101 and adjust the electromagnetic forces exerted on the body of the electromagnetic resonator 103 to adjust for the effects of atmospheric drag on the positions of the support structure 101 and the electromagnetic resonator 103 in relation to one another. As another example, if the satellite is re-oriented during its orbit, to maintain a constant attitude relative to the sun, the cavity may need to be slowly reoriented inside its enclosure, to maintain a desired orientation of its body axes relative to the frame, so as to stay in the rattle space and not contact the inside of the frame as the satellite is re-oriented. Further, the processing unit 127 may also account for differences between other forces exerted on the support structure 101 and the electromagnetic resonator 103.

As described above, electromagnetic forces may maintain the electromagnetic resonator 103 levitated within a volume enclosed by a frame of a support structure 101. The electromagnetic forces may support the electromagnetic resonator 103 without exciting mechanical modes within the body of the electromagnetic resonator 103. By preventing the excitation of mechanical modes and supporting the electromagnetic resonator 103 through electromagnetic forces, vibrations experienced by the support structure 101 may not be transferred to the body of the electromagnetic resonator 103, thus increasing the accuracy of the electromagnetic resonator 103. and the performance of the optical device 121 that uses signals and/or light produced by the electromagnetic resonator 103.

In additional embodiments, the electrodes may be used to both monitor and damp unwanted vibrational modes of the body of the electromagnetic resonator 103. For example, even while the processing unit calculates the correct forces to apply to the resonator to maintain the correct position of the center of mass, and orientation of the body axes of the resonator relative to geometry of the rattle space, it may also calculate and apply damping forces using the electrodes, to damp or drive to zero any vibrational modes of the body. In this way the system can confine the body to the rattle space with little or no net excitation of vibrational modes of the cavity.

Figure 2:
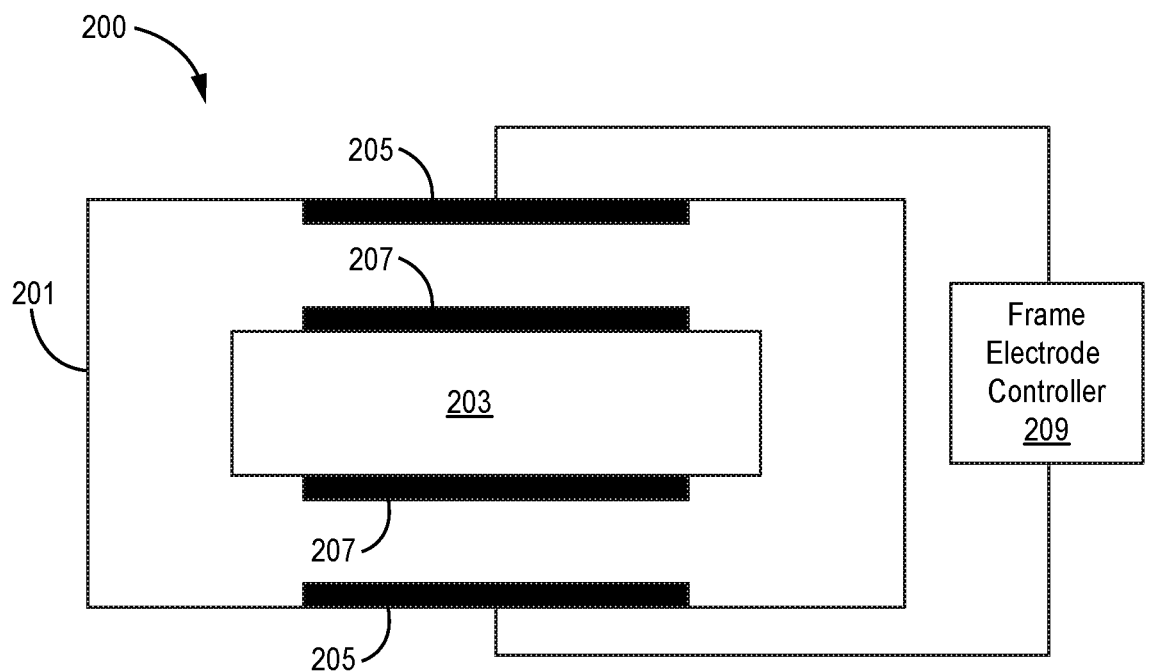
FIG. 2 is a block diagram illustrating an object electrostatically confined within a frame according to an aspect of the present disclosure.

FIG. 2 is a diagram illustrating an exemplary embodiment of a system 200 for supporting an object 203 within a volume enclosed by a frame 201. As used herein, the frame 201 may be part of a support structure, such as the support structure 101 described above. As described above, the support structure may support an object 203 using levitation as describe above. Further, the object 203 may be an electromagnetic resonator such as the electromagnetic resonator 103 in FIG. 1. Alternatively, the object 203 may be any object having performance that benefits from protection from the excitation of mechanical modes and/or the effects of structures that provide support against the force of gravity.

As shown in FIG. 2, the frame 201 may have one or more frame electrodes 205 attached thereto. For example, the frame electrodes 205 may be attached to the frame 201 such that they are able to emit electromagnetic fields into an internal volume of the frame 201. For example, the frame electrodes 205 may be formed on an external surface of the frame 201 while emitting electromagnetic fields into the interior volume. The frame electrodes 205 may be part of the frame 201, or the frame electrodes 205 may be formed on an internal surface of the frame 201. Additionally, the frame 201 may enclose an object 203 having body electrodes 207 formed thereon. The body electrodes 207 may be positioned to respond to the electromagnetic fields emitted by the frame electrodes 205.

In certain embodiments, the frame electrodes 205 may be electrically coupled to a frame electrode controller 209. As used herein, the frame electrode controller 209 may provide electrical signals to the electrodes 205 that control the magnitude of the emitted electromagnetic fields for the various different electrodes 205. For example, where there are two frame electrodes 205, the frame electrode controller 205 may separately control the magnitude of the different frame electrodes to control the position of the object 203 by controlling the electromagnetic forces exerted on the body electrodes 207. In some implementations, a processing unit, such as the processing unit 127 in FIG. 1, may function as the frame electrode controller 209. While the frame electrode controller 209 is illustrated as being electrically coupled to the frame electrodes 205, the frame electrode controller 209 may alternatively be coupled to the body electrodes 207 on the object 203 to control the electromagnetic forces emitted by the body electrodes 207 on the frame electrodes 205.

As described above, the frame electrode controller 209 may be electrically coupled to the frame electrodes 205 and/or the body electrodes 207 to control the position of the object within the frame 201. In certain embodiments, the frame electrode controller 209 controls the forces exerted on the body of the object such that mechanical modes are not excited within the body of the object 203. For example, the frame electrode controller 209 may allow the object 203 to float about an interior volume that is enclosed by the frame 201 while directing the electrodes 205 and 207 to exert a force that is sufficient to prevent the body 203 from contacting internal surfaces within the frame 201 but not exert forces which would have the effect of communicating to the levitated body 203, the vibrations experience by the frame 201. This may be accomplished by electronic filtering or otherwise processing the electromagnetic signals sent to the electrodes 205 and 207 by the frame electrode controller 209, wherein the processor would apply signals of a calculated strength, duration, spectral composition, and spatial pattern among the one or more electrodes 205 and 207 so as to keep the body 203 in the rattle space, without transmitting vibrational forces that may excite vibrational modes of the levitated body 203.

In additional embodiments, along with directing the movement of the body 203 within the interior volume enclosed by the frame 201, the frame electrode controller 209 may receive signals from the frame electrodes 205 that can be used by the frame electrode controller 209 to determine the position of the body 203 in relation to the frame 201. Using this position information, the frame electrode controller 209 may calculate acceleration information for larger systems coupled to the frame 100. Accordingly, the system 200 may also function as an accelerometer or gyroscope.

Figure 3:
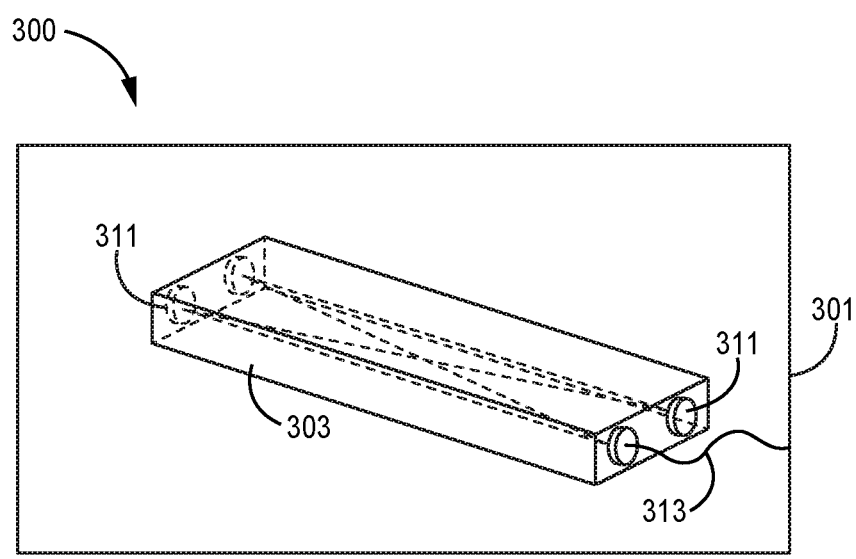
FIG. 3 is a block diagram illustrating an electromagnetic resonator electrostatically confined within a frame according to an aspect of the present disclosure.

FIG. 3 is a diagram of a system 300 containing an electromagnetic resonator 303 located within an interior volume enclosed by a frame 301. For example, the frame 301 and attached frame electrodes may function similarly to the frame 201 and frame electrodes 205 described above in FIG. 2. Further, the body electrodes on the body of the electromagnetic resonator 303 may also function similarly to the body electrodes 207 in FIG. 2. Also, the electromagnetic resonator 303 may function in a similar manner to the electromagnetic resonator 103 described above in FIG. 1.

In certain embodiments, as the use of electromagnetic fields to support the electromagnetic resonator 303 within the internal volume enclosed by the frame 301 may reduce the vibrations experienced by the electromagnetic resonator 303, different shapes and reflection patterns may be used for the electromagnetic resonator 303. In some embodiments, the electromagnetic resonator 303 may include mirrors located on opposite sides of the electromagnetic resonator 303, where light is introduced into the electromagnetic resonator 303 and reflected between the mirrors. Alternatively, the electromagnetic resonator 303 may have more than two mirrors mounted within a cavity of the resonator, such as the four mirrors 311 shown in FIG. 3.

As illustrated, one or more of the mirrors 311 may be a partially reflective mirror. Light may be introduced into the electromagnetic resonator 303 through one of the mirrors using a light introduction device 313. As used herein, the light introduction device 313 may be a device capable of introducing light produced from a light source (such as the light source 123 in FIG. 1) outside the frame 301 into the electromagnetic resonator 303. For example, the light introduction device 313 may include a flexible fiber optic cable that extends from the frame 301 to the electromagnetic resonator 303, where light is shined through the fiber optic cable and introduced into the electromagnetic resonator 303. Alternatively, a laser may shine light from the frame 301 to receiving optics for transmission through a mirror 311 into the electromagnetic resonator 303.

When light is introduced into the electromagnetic resonator 303, a plurality of mirrors 311 may reflect the light about a resonant cavity within the electromagnetic resonator 303. When the resonant cavities are subjected to gravitational forces or experience vibrations from the containing system, the possible optical paths traversed by the reflected light may be limited because of the effects of vibrations and gravity on the body of the electromagnetic resonator 303. However, when the electromagnetic resonator 303 is levitated within a frame 301, the isolation of the electromagnetic resonator 303 from physical contact with the frame 301 may allow a greater variety of optical paths within the body of the electromagnetic resonator 303 because the electromagnetic resonator 303 is not coupled to vibrations of the frame 301.

In exemplary embodiments, the electromagnetic resonator 303 may include four mirrors 311, where each mirror 311 is positioned on different surfaces within the electromagnetic resonator 303. Additionally, each mirror 311 is positioned on a surface that orthogonally intercepts adjacent and connected surfaces. Accordingly, light may be reflected off of the mirrors 311 to mirrors 311 that are mounted on adjacent but orthogonal surfaces until the light is received by the mirror 311 through which the light was originally introduced. In some embodiments, the mirror 311 through which light was introduced into the electromagnetic resonator 303 may be a partially reflective mirror. When a mirror 311 is partially reflective, a portion of the light incident on the mirror will be reflected by the mirror 311 and a portion of the light incident on the mirror 311 will pass through the mirror 311. Alternatively, a mirror 311 other than the mirror 311 through which light was introduced may be partially reflective for the purposes of allowing light to be coupled out of the electromagnetic resonator 303.

In certain embodiments, when light is coupled out of the electromagnetic resonator 303, the light may be coupled out through the light introduction device 313 as shown in FIG. 3. Alternatively, the light may be coupled out through another device similar to the light introduction device 313 that is dedicated for transmitting the light from the electromagnetic resonator 303 to a device outside the frame 301. For example, the light may be coupled out through the frame 301 to be received by a photodetector that receives the optical signal and converts the signal into an electrical signal for use by another device in the system such as the optical device 121 in FIG. 1.

Further, light resonating within the electromagnetic resonator 303 may be incident on a photodetector mounted to the outside of the electromagnetic resonator 303. For example, the photodetector may be mounted to a partially reflective mirror 311. When light is incident on the partially reflective mirror 311, a portion of the light may pass through the mirror 311 and be detected by the photodetector 315. When the photodetector 315 receives the light through the mirror 311, the photodetector 315 may produce an electrical signal. Additionally, the photodetector 315 may be electrically coupled to a device outside of the frame 301 through a connecting wire. Alternatively, the photodetector 315 may be capable of wirelessly communicating with electronic devices outside of the frame 301.

Accordingly, based on the above described embodiments, light may be introduced into the electromagnetic resonator 303, resonate within the cavity, and signals can be acquired from the cavity, while limiting the effects of vibrations experienced by the frame 301 on the electromagnetic resonator 303.

FIGS. 4A-4E are diagrams illustrating several alternative shapes for an electromagnetic resonator 403-a-403-e that may be used within a frame as described above in connection with FIGS. 1-3. While FIGS. 4A-4E illustrate various different shapes, other shapes for electromagnetic resonators may be implemented as made possible through the use of a levitated cavity.

FIG. 4A illustrates an electromagnetic resonator 403-a having two mirrors 411-a located on opposite ends of the electromagnetic resonator 403-a. Accordingly, light 415-a may be introduced into the electromagnetic resonator 403-a through one of the mirrors 411-a. The introduced light 415-a may be reflected between the two mirrors 411-a such that light having a resonant frequency associated with the distance between the two mirrors 411-a is reflected between the two mirrors 411-a and transmitted through one of the mirrors 411-a for use by another device as described above.

FIG. 4B illustrates an electromagnetic resonator 403-b having four mirrors 411-b located at various locations on the external surface of the electromagnetic resonator 403-b. Accordingly, light 415-b may be introduced into the electromagnetic resonator 403-b through one of the mirrors 411-b. The introduced light 415-b may travel through a z-shaped cavity within the electromagnetic resonator 403-b before being reflected back upon itself, where the light may exit the electromagnetic resonator 403-b through the mirror 411-b through which the light 415-b entered the electromagnetic resonator 403-b. The light that exits the electromagnetic resonator 403-b may be at a resonant frequency associated with the distance between the various mirrors within the electromagnetic resonator 403-b.

FIG. 4C illustrates an electromagnetic resonator 403-c having four mirrors 411-c located at various locations on the external surface of the electromagnetic resonator 403-c. Accordingly, light 415-c may be introduced into the electromagnetic resonator 403-c through one of the mirrors 411-c. The introduced light 415-c may travel around a rectangularly-shaped cavity within the electromagnetic resonator 403-c before exiting the electromagnetic resonator 403-c through one of the mirrors 411-c. The light that exits the electromagnetic resonator 403-c may be at a resonant frequency associated with the distance of the path traveled by the light within the electromagnetic resonator 403-c.

FIG. 4D illustrates an electromagnetic resonator 403-d having three mirrors 411-d located at various locations on the external surface of the electromagnetic resonator 403-d. Accordingly, light 415-d may be introduced into the electromagnetic resonator 403-d through one of the mirrors 411-d. The introduced light 415-d may travel around a triangularly-shaped cavity within the electromagnetic resonator 403-d before exiting the electromagnetic resonator 403-d through one of the mirrors 411-d. The light that exits the electromagnetic resonator 403-d may be at a resonant frequency associated with the distance of the path traveled by the light within the electromagnetic resonator 403-d.

FIG. 4E illustrates an electromagnetic resonator 403-e having four mirrors 411-e located at various locations on the external surface of the electromagnetic resonator 403-e. Accordingly, light 415-e may be introduced into the electromagnetic resonator 403-e through one of the mirrors 411-e. The introduced light 415-e may travel around a hourglass-shaped cavity within the electromagnetic resonator 403-e before exiting the electromagnetic resonator 403-e through one of the mirrors 411-e. The light that exits the electromagnetic resonator 403-e may be at a resonant frequency associated with the distance of the path traveled by the light within the electromagnetic resonator 403-e.

FIG. 5 illustrates the performance of a mechanical modal analysis for an electromagnetic resonator 503, where the electromagnetic resonator 503 includes two mirrors separated by a spacer. In certain embodiments, a mechanical modal analysis may be performed to determine the response of the body of the electromagnetic resonator 503 to forces applied to the surface of the body. As illustrated, FIG. 5 shows various bending modes 510-a-510-c along one body axis. For example, 510-a illustrates a first bending mode of the body along a body axis; 510-b illustrates a second bending mode of the body along the body axis; and 510-c illustrates a third bending mode of the body along the body axis. While FIG. 5 illustrates the performance of a mechanical modal analysis along one body axis, the mechanical modal analysis may be performed on multiple axes.

Figure 6:
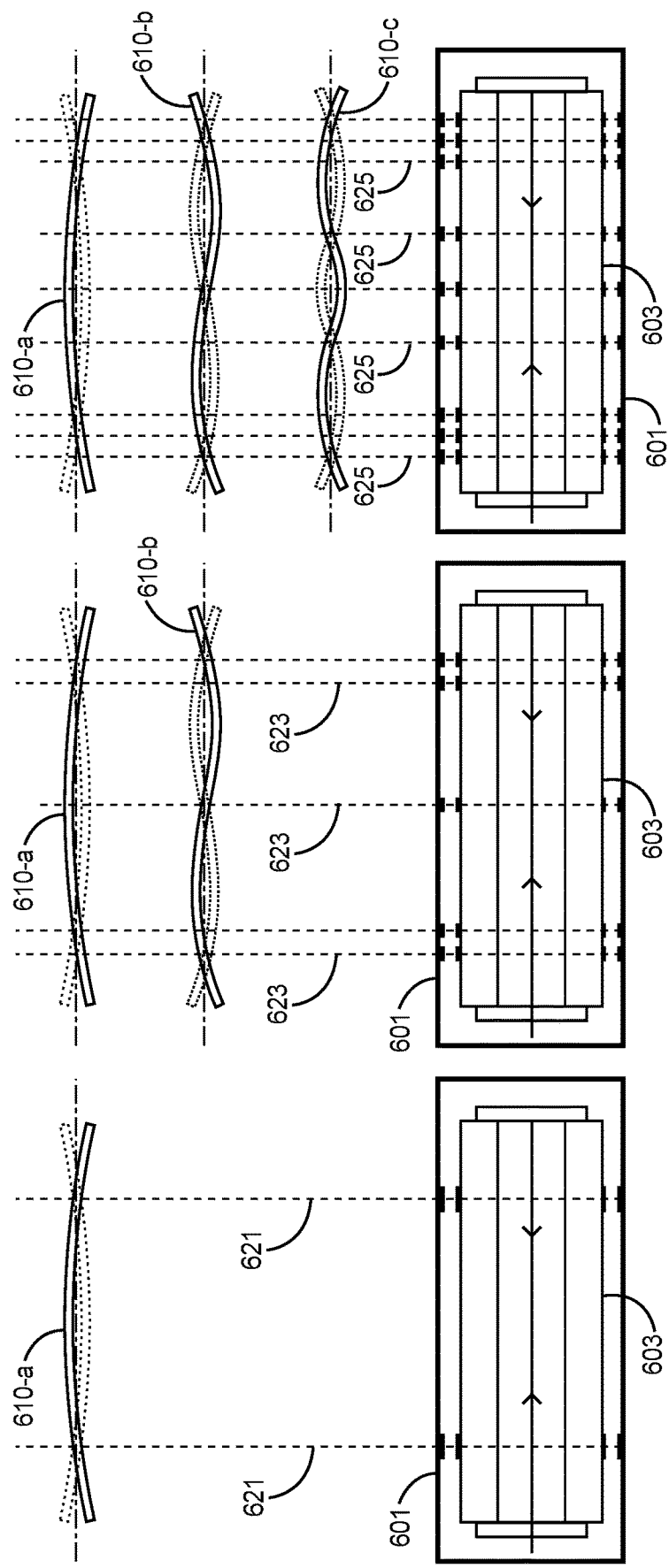
FIG. 6 is a diagram illustrating the identification of nodes and anti-nodes based on data acquired through the performance of a mechanical modal analysis according to an aspect of the present disclosure.

FIG. 6 illustrates the identification of node locations on a body based on the results of the mechanical modal analysis performed as described in FIG. 5, where the location of the nodes may be used for the placement of electrodes on the body of the electromagnetic resonator 603 and the frame 601. As illustrated, a mechanical modal analysis may identify a first bending mode 610-a for the body of the electromagnetic resonator 603. As part of performing the mechanical modal analysis for the electromagnetic resonator 603, the analysis may identify the nodes for a particular bending mode, where a node is the location on the body that does not move during the excitation of the bending mode. For example, for the first bending mode 610-a, the mechanical modal analysis may identify the two nodes 621. When a node is identified, electrodes may be placed at corresponding locations on the surface of the electromagnetic resonator 603 and the frame 601. Similarly, for the second bending mode 610-b, the mechanical modal analysis may identify three nodes 623. When the three nodes are identified, electrodes may be placed at corresponding locations on the surface of the electromagnetic resonator 603 and the frame 601 in combination with the electrodes associated with the first bending mode 610-a. Additionally, for the third bending mode 610-c, the mechanical modal analysis may identify four nodes 625. When the four nodes are identified, electrodes may be placed at corresponding locations on the surface of the electromagnetic resonator 603 and the frame 601 in combination with the electrodes associated with the first bending mode 610-a and the second bending mode 610-b.

As shown, the electrodes are placed at nodes for the first three bending modes for a particular axis. Additional nodes may be placed on the surface of the electromagnetic resonator 603 for additional bending modes. Further, the nodes may be placed on the surface of the electromagnetic resonator 603 for nodes of bending modes in multiple axes.

Figure 7:
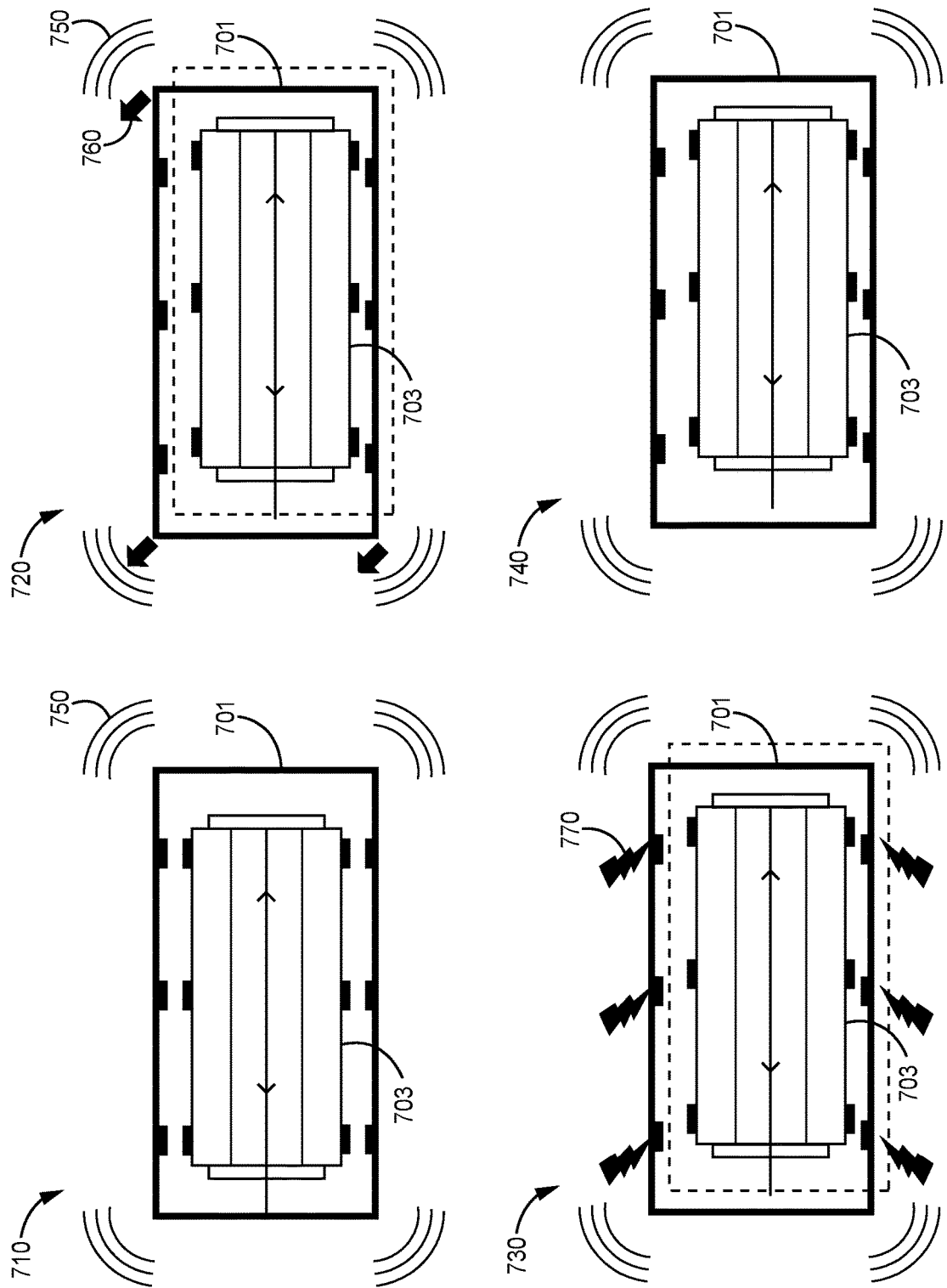
FIG. 7 is a diagram illustrating the suppression of quasi-DC motion according to an aspect of the present disclosure.

FIG. 7 illustrates an exemplary embodiment for driving the electrodes in response to sensed motion of the frame 701. As shown, FIG. 7 illustrates several states of an electromagnetic resonator 703 in relation to the frame 701. In a first state 710, the electromagnetic resonator 703 may be within the frame 701. Additionally, there may be rattle space between the external surfaces of the electromagnetic resonator 703 and the internal surfaces of the frame 701. Further, while the frame 701 may experience vibrations 750, the vibrations 750 may have little to no effect on the body of the electromagnetic resonator 703 as the average position of the frame 701 does not change. Accordingly, the body of the electromagnetic resonator 703 may be in free fall during the first state 710.

In some embodiments, in a second state 720, the frame may acquire a quasi-DC velocity 760 relative to the free-falling body of the electromagnetic resonator 703. A frame electrode controller or other computing device may determine that if no forces are applied by the electrodes, the external surfaces of the body of the electromagnetic resonator 703 may come in contact with the internal surfaces of the frame 701. Accordingly, in a third state 730, the frame electrode controller may drive a calculated subset of electrodes with the correct amplitude and duration, to maintain a non-zero distance between the internal surfaces of the frame 701 and the external surfaces of the body of the electromagnetic resonator 703. Also, the frame electrode controller may drive the electrodes in such a way to prevent the transmission of vibrations 750 to the body of the electromagnetic resonator. As shown in a fourth state 740, the motion of the body of the electromagnetic resonator 703 in relation to the frame 701 may be stopped.

Figure 8:
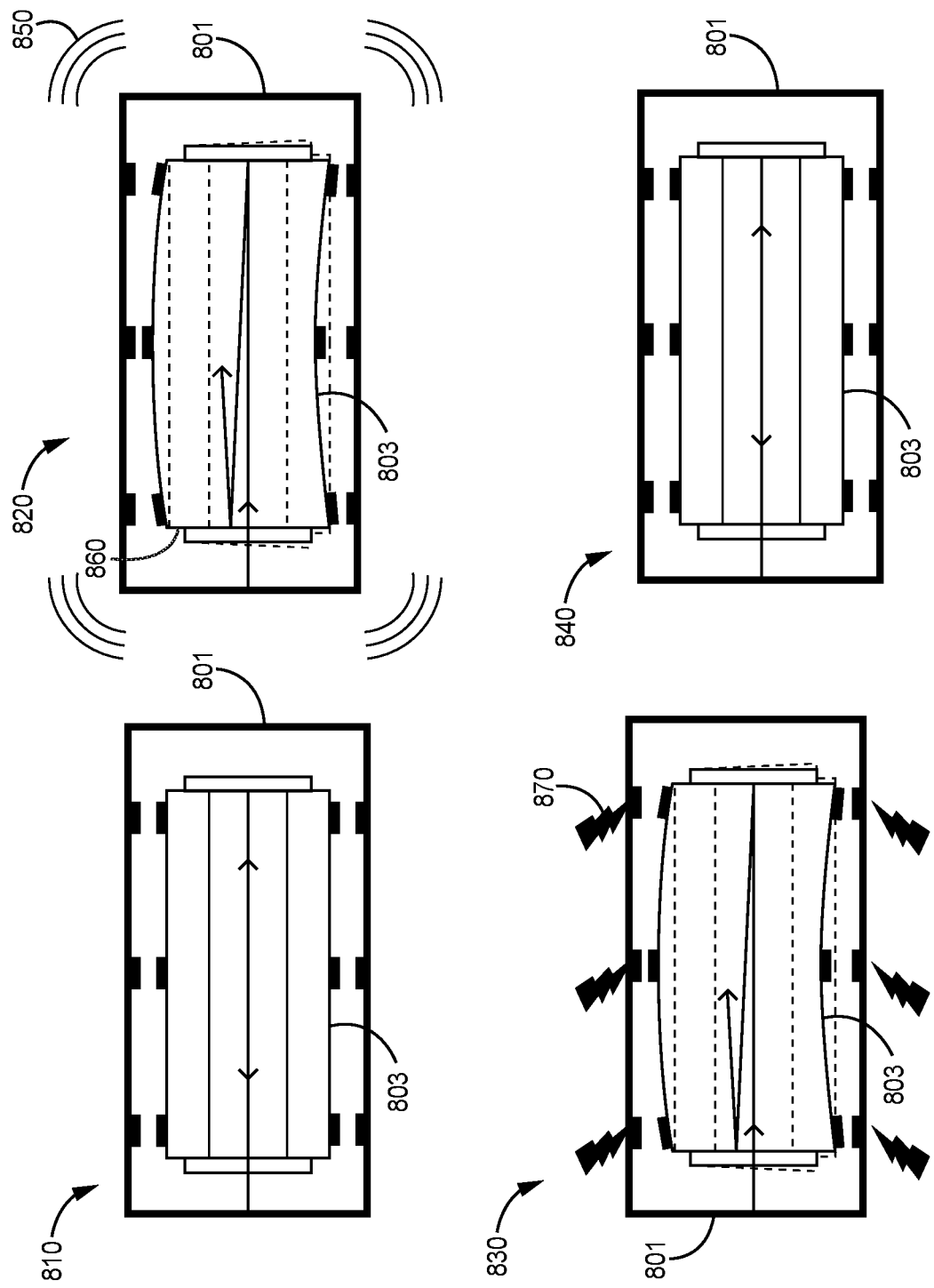
FIG. 8 is a diagram illustrating the dampening of vibrational modes according to an aspect of the present disclosure.

FIG. 8 illustrates an exemplary embodiment for driving the electrodes for suppressing detected motion in the electromagnetic resonator 803. As shown, FIG. 8 illustrates several states of an electromagnetic resonator 803 in relation to the frame 801. In a first state 810, the electromagnetic resonator 803 may be within the frame 801. Additionally, there may be rattle space between the external surfaces of the electromagnetic resonator 803 and the internal surfaces of the frame 801. Accordingly, the body of the electromagnetic resonator 803 may be in free fall within the frame 801 during the first state 810. In a second state 820, the frame 801 may experience vibrations 850, in some situations, the vibrations 850 may impart a vibrational mode 860 to the body of the electromagnetic resonator 803.

In some embodiments, in a third state 830, a frame electrode controller or other computing device may determine that vibrational modes of the body of the electromagnetic resonator 803 are excited. Accordingly, in a third state 730, the frame electrode controller may drive a calculated subset of electrodes with the correct amplitude and duration, to dampen the vibrational mode excitation of the body of the electromagnetic resonator 803. As shown in a fourth state 840, the forces applied by the electrodes have dampened the vibration experienced by the body of the electromagnetic resonator 803.

Figure 9:
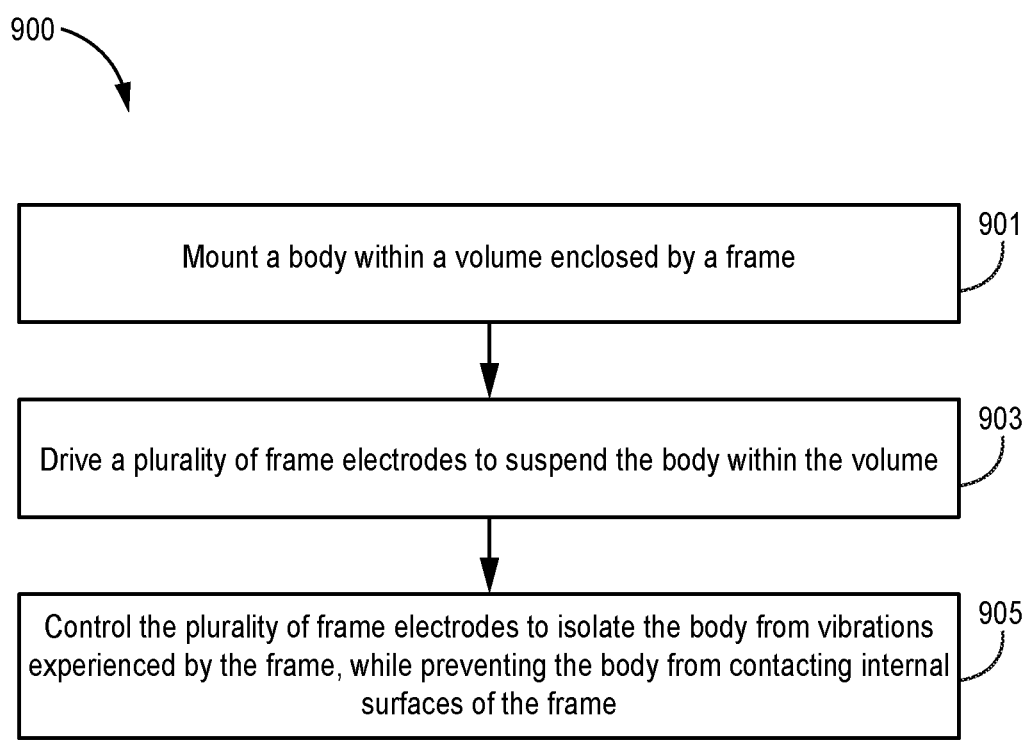
FIG. 9 is a flowchart diagram illustrating an exemplary method for electrostatically confining an object within a frame according to an aspect of the present disclosure.

FIG. 9 is a flow chart diagram of a method 900 for electrostatically confining an object within a frame. Method 900 proceeds at 901, where a body is mounted within a volume enclosed by a frame. Further, method 900 proceeds at 903, where a plurality of frame electrodes are driven to suspend the body with the volume. For example, the plurality of frame electrodes may be mounted on internal surfaces of the frame and a plurality of body electrodes may be mounted on external surfaces of the body. Additionally, method 900 proceeds at 905, where the plurality of frame electrodes are controlled to isolate the body from vibrations experienced by the frame and of damping internal vibrational motions of the body, while preventing the body from contacting internal surfaces of the frame.

EXAMPLE EMBODIMENTS

Example 1 includes a device comprising: an electromagnetic resonator body; a frame enclosing a volume, wherein the electromagnetic resonator body is located within the volume; a plurality of body electrodes mounted on the electromagnetic resonator body; a plurality of frame electrodes mounted on the frame; and an electrode controller, wherein the electrode controller drives the plurality of frame electrodes to isolate the electromagnetic resonator body from vibrations to the frame by allowing a rattle space between external surfaces of the electromagnetic resonator body and internal surfaces of the frame to approach but be greater than zero.

Example 2 includes the device of Example 1, wherein the plurality of body electrodes and the plurality of frame electrodes are placed at locations such that when the plurality of frame electrodes are driven by the electrode controller, forces exerted by the plurality of frame electrodes do not excite mechanical modes of the body.

Example 3 includes the device of Example 2, wherein the locations are associated with the nodes and anti-nodes of the internal modes of the body as determined using mechanical modal analysis.

Example 4 includes the device of any of Examples 1-3, wherein light is introduced into the electromagnetic resonator.

Example 5 includes the device of Example 4, wherein the light is introduced into the electromagnetic resonator using a fiber optic cable that couples light from outside the frame into an interior volume within the electromagnetic resonator.

Example 6 includes the device of any of Examples 1-5, wherein the electrode controller drives the plurality of frame electrodes in response to low frequency movements experienced by the frame.

Example 7 includes the device of any of Examples 1-6, wherein the electrode controller drives the plurality of frame electrodes in response to vibrational excitation of mechanical modes of the body.

Example 8 includes the device of any of Examples 1-7, further comprising a photodetector mounted on the electromagnetic resonator body, wherein the photodetector is positioned to detect light resonating within the electromagnetic resonator body and provide an electrical signal associated with a frequency of the resonating light to a device outside of the frame.

Example 9 includes the device of any of Examples 1-8, wherein light in the electromagnetic resonator body is reflected between two or more mirrors.

Example 10 includes the device of any of Examples 1-9, wherein the plurality of frame electrodes are driven such that a force exerted on the electromagnetic resonator is equal to acceleration due to gravity.

Example 11 includes a system comprising: a body; a frame enclosing a volume, wherein the body is located within the frame; a plurality of body electrodes mounted on external surfaces of the body; a plurality of frame electrodes mounted on internal surfaces of the frame; and an electrode controller, wherein the electrode controller drives the plurality of frame electrodes, wherein the plurality of body electrodes and the plurality of frame electrodes are patterned such that, when driven, the plurality of frame electrodes does not excite mechanical modes of the body.

Example 12 includes the system of Example 11, wherein locations of the plurality of body electrodes are associated with the nodes and anti-node of mechanical modes of the body as determined using mechanical modal analysis.

Example 13 includes the system of any of Examples 11-12, wherein the body is an electromagnetic resonator.

Example 14 includes the system of Example 13, wherein light is introduced into the electromagnetic resonator.

Example 15 includes the system of Example 14, wherein the light is introduced into the electromagnetic resonator using a fiber optic cable that couples light from outside the frame into an interior volume within the electromagnetic resonator.

Example 16 includes the system of any of Examples 13-15, further comprising a photodetector mounted on the electromagnetic resonator, wherein the photodetector is positioned to detect light resonating within the electromagnetic resonator and provide an electrical signal associated with a frequency of the resonating light to a device outside of the frame.

Example 17 includes the system of any of Examples 11-16, wherein the electrode controller drives the plurality of frame electrodes in response to low frequency movements experienced by the frame.

Example 18 includes the system of any of Examples 11-17, wherein the electrode controller drives the plurality of frame electrodes in response to vibrational excitation of mechanical modes of the body.

Example 19 includes the system of any of Examples 11-18, wherein the frame controller drives the plurality of frame electrodes to allow a rattle space between external surfaces of the body and internal surfaces of the frame to approach but be greater than zero.

Example 20 includes a method comprising: mounting a body within a volume enclosed by a frame; driving a plurality of frame electrodes to suspend the body within the volume, wherein the plurality of frame electrodes are mounted on internal surfaces of the frame and a plurality of body electrodes are mounted on external surfaces of the body; and controlling the plurality of frame electrodes to isolate the body from vibrations experienced by the frame, and of damping internal vibrational motions of the body, while preventing the body from contacting the internal surfaces of the frame.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A device comprising:
    an electromagnetic resonator body;
    a frame enclosing a volume, wherein the electromagnetic resonator body is located within the volume;
    a plurality of body electrodes mounted on the electromagnetic resonator body;
    a plurality of frame electrodes mounted on the frame; and
    an electrode controller, wherein the electrode controller drives the plurality of frame electrodes to isolate the electromagnetic resonator body from vibrations to the frame by allowing a rattle space between external surfaces of the electromagnetic resonator body and internal surfaces of the frame to approach but be greater than zero, wherein the electrode controller also drives the plurality of frame electrodes to support the electromagnetic resonator body within the frame without making physical contact with the electromagnetic resonator body and to prevent the electromagnetic resonator body from physically contacting the internal surfaces of the frame.

2. The device of claim 1, wherein the plurality of body electrodes and the plurality of frame electrodes are placed at locations such that when the plurality of frame electrodes are driven by the electrode controller, forces exerted by the plurality of frame electrodes do not excite mechanical modes of the body.

3. The device of claim 2, wherein the locations are associated with nodes and anti-nodes of the mechanical modes of the body as determined using mechanical modal analysis.

4. The device of claim 1, wherein light is introduced into the electromagnetic resonator.

5. The device of claim 4, wherein the light is introduced into the electromagnetic resonator using a fiber optic cable that couples the light from outside the frame into an interior volume within the electromagnetic resonator.

6. The device of claim 1, wherein the electrode controller drives the plurality of frame electrodes in response to low frequency movements experienced by the frame.

7. The device of claim 1, wherein the electrode controller drives the plurality of frame electrodes in response to vibrational excitation of mechanical modes of the body.

8. The device of claim 1, further comprising a photodetector mounted on the electromagnetic resonator body, wherein the photodetector is positioned to detect light resonating within the electromagnetic resonator body and provide an electrical signal associated with a frequency of the resonating light to an external device outside of the frame.

9. The device of claim 1, wherein light in the electromagnetic resonator body is reflected between two or more mirrors.

10. The device of claim 1, wherein the plurality of frame electrodes are driven such that a force exerted on the electromagnetic resonator is equal to acceleration due to gravity.

11. A system comprising:
a body;
a frame enclosing a volume, wherein the body is located within the frame;
a plurality of body electrodes mounted on external surfaces of the body;
a plurality of frame electrodes mounted on internal surfaces of the frame; and
an electrode controller, wherein the electrode controller drives the plurality of frame electrodes, wherein the plurality of body electrodes and the plurality of frame electrodes are patterned such that, when driven, the plurality of frame electrodes does not excite mechanical modes of the body, wherein the electrode controller also drives the plurality of frame electrodes to support the body within the frame without making physical contact with the body and to prevent the body from physically contacting the internal surfaces of the frame.

12. The system of claim 11, wherein locations of the plurality of body electrodes are associated with nodes and anti-nodes of the mechanical modes of the body as determined using mechanical modal analysis.

13. The system of claim 11, wherein the body is an electromagnetic resonator.

14. The system of claim 13, wherein light is introduced into the electromagnetic resonator.

15. The system of claim 14, wherein the light is introduced into the electromagnetic resonator using a fiber optic cable that couples light from outside the frame into an interior volume within the electromagnetic resonator.

16. The system of claim 13, further comprising a photodetector mounted on the electromagnetic resonator, wherein the photodetector is positioned to detect light resonating within the electromagnetic resonator and provide an electrical signal associated with a frequency of the resonating light to a device outside of the frame.

17. The system of claim 11, wherein the electrode controller drives the plurality of frame electrodes in response to low frequency movements experienced by the frame.

18. The system of claim 11, wherein the electrode controller drives the plurality of frame electrodes in response to vibrational excitation of the mechanical modes of the body.

19. The system of claim 11, wherein the frame controller drives the plurality of frame electrodes to allow a rattle space between the external surfaces of the body and the internal surfaces of the frame to approach but be greater than zero.

20. A method comprising:
mounting a body within a volume enclosed by a frame;
driving a plurality of frame electrodes to suspend the body within the volume, wherein the plurality of frame electrodes are mounted on internal surfaces of the frame and a plurality of body electrodes are mounted on external surfaces of the body; and
controlling the plurality of frame electrodes to isolate the body from vibrations experienced by the frame, and of damping internal vibrational motions of the body, while preventing the body from physically contacting the internal surfaces of the frame, and supporting the body within the frame without making physical contact with the body.

* * * * *